United States Patent [19]

Iwasa et al.

[11] Patent Number: 4,994,951
[45] Date of Patent: Feb. 19, 1991

[54] PWM INVERTER CONTROL UNIT

[75] Inventors: Masao Iwasa, Chiba; Yasutami Kito, Aichi, both of Japan

[73] Assignee: Otis Elevator Company, Farmington, Conn.

[21] Appl. No.: 340,988

[22] Filed: Apr. 20, 1989

[30] Foreign Application Priority Data

Apr. 21, 1988 [JP] Japan .................................. 63-99226

[51] Int. Cl.$^5$ ............................................. H02M 1/12
[52] U.S. Cl. ........................................ 363/41; 363/98; 318/811
[58] Field of Search ...................... 363/17, 41, 98, 132, 363/136; 318/807, 808, 809, 810, 811

[56] References Cited

U.S. PATENT DOCUMENTS 4,772,996  9/1988  Hanei et al. ............................. 363/41

Primary Examiner—Steven L. Stephan
Assistant Examiner—Emanuel Todd Voeltz
Attorney, Agent, or Firm—Breffni X. Baggot

[57] ABSTRACT

The present invention is achieved with a control unit for a PWM inverter for comparing (8) a voltage command signal (7) with the fundamental of the inverter's output voltage waveform and for comparing (11) the result with a carrier signal (10) and using that result to keep the output voltage waveform equal to the voltage command signal. The use of the output's fundamental for feedback eliminates the prior art need to use slight delays in the inverter's switching stage thereby removing the prior art torque ripple and consequent vibration problems particularly at low speed and furthermore enables smoother stopping and starting control using variable speed ranges of several hundred to one.

2 Claims, 2 Drawing Sheets

PWM INVERTER CONTROL UNIT

TECHNICAL FIELD

The present invention relates to control of a PWM inverter by detecting the fundamental component of the inverter output, comparing it with an inverter command signal to provide a difference signal, and using the difference signal to provide pulse width modulated (PWM) inverter signals.

BACKGROUND ART

In an induction motor (hereinafter, referred to as "IM") driven at variable speeds, PWM inverters are often utilized for the drive. Speed feedback is often omitted in such systems due to cost and reliability advantages. When such inverters drive the IM without using a speed feedback loop, current hunting is liable to occur in a particular periodicity range under a light load and torque ripple is liable to result. The current hunting may in some cases disable the control of the inverter. The IM, especially when driven at slow speed, is influenced by the torque ripple. Such inverters produce too much vibration to be used for applications intolerant of vibration (for example, elevator drive). Consequently, to avoid excessive control capability in the low speed range, the effective variable speed range is usually provided at no greater than 20 to 1.

The cause of the ripple lies in a delay of ON/OFF operation of power switching elements (as shown in TU to TW and TX to TZ in FIG. 2) composing an output section of an inverter This delay requires the switching command for ON→OFF→ON operation of each switching element to have a further delay (because it is necessary to prevent positive and negative power sources from being short-circuited by means of the operation delay of a transistor). Such inverters therefore provide an artificially imposed dead time between switchings, which unfortunately produces a difference between a commanded output voltage and an actual output voltage and hence a waveform distortion. Further, since the operational delays of the power switching elements and control elements are subject to manufacturing variables, the difference produced between a theoretical control value and an actual output value causes a further waveform distortion as shown by a dotted line in FIG. 3.

The foregoing control unit thus cannot be used for applications intolerant of vibration such as an elevator drive.

DISCLOSURE OF INVENTION

Therefore, an object of this invention is to provide improved PWM inverter control.

According to the present invention, a PWM inverter control detects an inverter output fundamental component, compares the fundamental to a command and with the difference therebetween controls the output to be equal to the command.

The foregoing may be achieved utilizing a summer responsive to an inverter output command signal and an inverter output response signal for providing a difference signal indicative of a difference in magnitudes therebetween, a comparator for comparing the difference signal with a modulating signal, the switching elements of the inverter driven on the result, being characterized, in that from the response signal is obtained a fundamental wave component thereof which may be obtained using a detecting circuit for removing components other than the fundamental wave component from the output signal of the inverter, the output signal of the fundamental wave component detecting circuit being input to the summer for comparing the command signal with the fundamental, amplifying the result and sending the amplified result to the comparator.

A control unit according to the present invention may utilize a fundamental wave component detecting circuit, which may be designed to detect the fundamental of the output voltage wave form of the inverter with high fidelity and may utilize a summer which may be designed to be a P-I control amplifier responsive to the fundamental signal for a first comparison comparing the fundamental signal with a voltage command signal and which amplifies the result, and may utilize a comparator responsive to the amplified result for a second comparison with a pulse width modulating signal and for driving the inverter based on the comparison.

As described above, according to the present invention, control stability is quite high. Each phase output may be individually controlled, so that control of the inverter may be made smoother. Further, this inverter may be controlled by a P-I amplifier following a voltage command signal, so that the power transistor outputs a complete sine voltage waveform. It is, therefore, possible to obtain a precise output voltage without being influenced by a delay or variety in elements. The present inverter control is consequently able to control a motor to provide quite small torque ripple, and provides the capability to operate in an open loop in a heretofore nonsmooth range of revolutions of several hundreds to 1.

These and other objects, features and advantages of the present invention will become more apparent in the light of the following detailed description of a best mode embodiment thereof, as illustrated in the accompanying drawing.

BEST MODE FOR CARRYING OUT THE INVENTION

Figure 1:
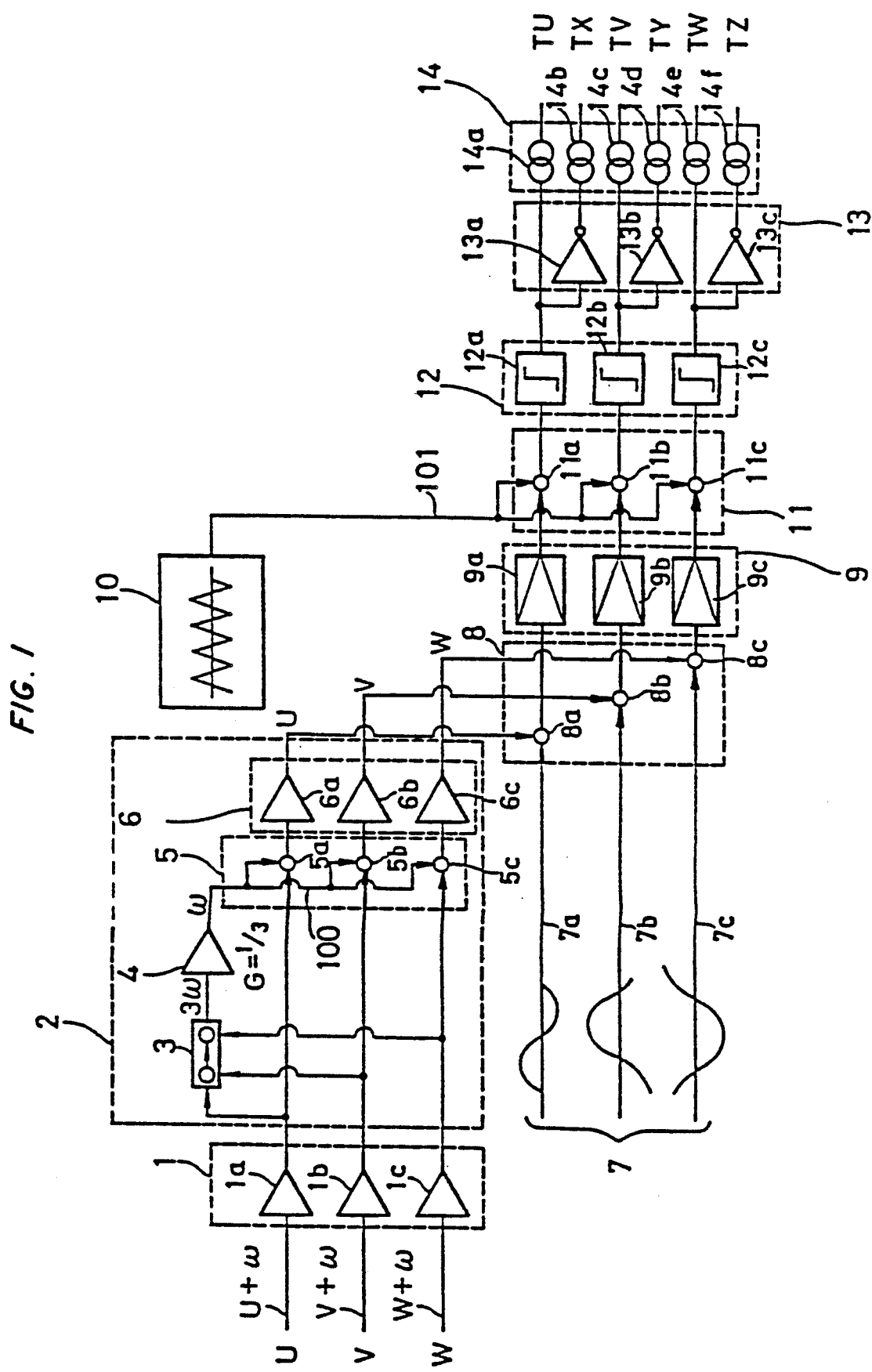
FIG. 1 is a circuit diagram showing one embodiment of this invention.
Figure 2:
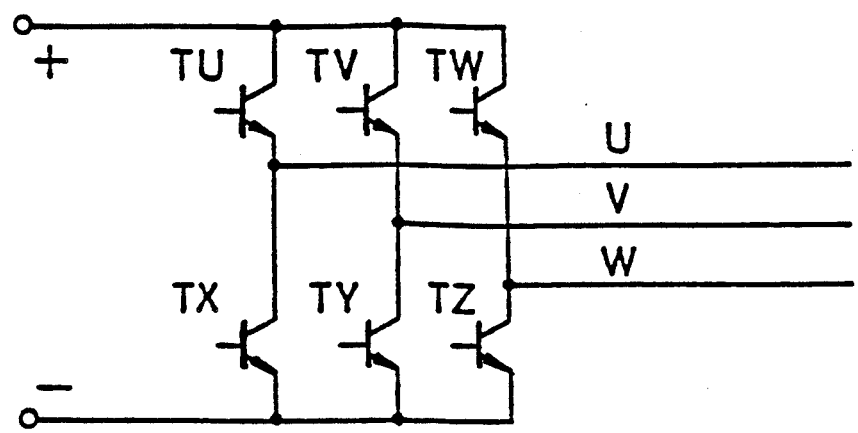
FIG. 2 is a circuit diagram showing one example of a general PWM inverter main circuit.
Figure 3:
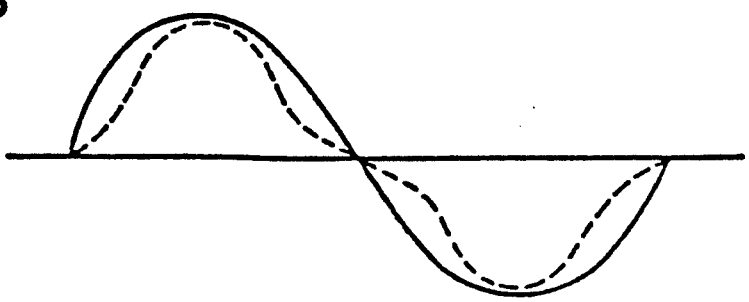
FIG. 3 is a view showing the difference between a target waveform and an actual output waveform.

FIG. 1 is a circuit diagram showing one embodiment of this invention. In this Figure, an inverter control circuit is composed of the elements as shown by numbers 1 to 14. The main circuit of the transistor inverter is composed of power transistors TU to TW and TX to TZ as shown in FIG. 2. In FIG. 1, a first amplifier 1 may be used and may comprise proportional amplifiers 1a to 1c (respectively providing filters if necessary). The proportional amplifiers 1a to 1c may be composed of operational amplifiers or the like. The first amplifier 1 detects at an input side signals from the inverter output lines U to W of FIG. 2. $(U+\omega)$, $(V+\omega)$ and $(W+\omega)$ are signals to be fed to the proportional amplifiers 1a to 1c. The amplified signals are further detected for their fundamental components in a subsequent stage 2 as described in more detail below.

U to W denote detecting voltages for fundamental waves. ω denotes an in-phase AC source component overlapped on the fundamental wave components. A fundamental wave component detecting circuit 2, which comprises a summing section 3, a second amplifier 4, a summing section 5 and a third amplifier 6. The summing section 3 is connected to the proportional amplifier 1a, 1b and 1c and serves to add the outputs of these amplifiers. The second amplifier 4 is connected at the input side to the summing section 3 and outputs $(U+\omega)+(V+\omega)+(W+\omega)=3\omega$. Assuming that the second amplifier gain is set at $\frac{1}{3}$, the amplifier output is $3\omega/3=\omega$. A summing section 5 comprises comparators or summers 5a to 5c. This summing section 5 is connected to the output side of the second amplifier 4 through a common line 100 and is connected to respective output sides of the proportional amplifiers 1a to 1c. This section serves to compare the output of the proportional amplifier 1a to 1c with the output of the proportional amplifier 4. A third amplifier 6 comprises amplifiers 6a to 6c. It is connected at the input side to the comparators 5a to 5c and outputs the compared output of $(U+\omega)-\omega=U$, $(V+\omega)-\omega=V$ and $(W+\omega)-\omega=W$. That is, it outputs a fundamental wave voltage signal from which all components ω except the fundamental wave component are removed.

A sine wave voltage command signal on three phase lines 7 denotes a signal for commanding the inverter's output voltage. A summing section 8 comprises comparators 8a to 8c. The comparators 8a to 8c are respectively connected to the U to V phase voltage signal lines and serve to compare the amplifier 6 output with the U to W phase commands. A P-I (proportional-integral) amplifier 9 comprising amplifiers 9a to 9c is connected at the input side to comparators 8a to 8c so as to compare each instant value of the U to V voltage command signals with the output of the amplifiers 6a to 6c and amplify the result.

A carrier signal generating circuit 10, which is connected to the input side of comparators 11a to 11c through a common line 101 serves to input the carrier signal to the comparators 11a to 11c. A summing section 11 comprises the comparators 11a to 11c, which compare the carrier signal with an amplifier 9 output and outputs the result.

A signal conditioning section 12 comprises conditioners 12a to 12c, which are connected at the input side to the comparators 11a to 11c to output the conditioned result. An inversion circuit 13 comprises NOT circuits 13a to 13c, which are connected at the input sides to the conditioners 12a to 12c and at the output sides to an insulating transmitter 14. The insulating transmitter 14 comprises transformers 14a to 14f. The output sides of the conditioners 12a to 12c are connected to the inputs of the transformers 14a, 14c and 14e. The output side of the NOT circuits 13a to 13c are connected to the input sides of the transformers 14b, 14d and 14f. The output sides of the transformers 14a to 14f are connected to the base electrodes of power transistors TU to TZ in the transistor inverter. The power transistors TU, TV, TW are turned on by the output signals of the conditioners, while the power transistors TX, TY, TZ are turned on by the output signals of the NOT circuits 13a to 13c.

Next, the function of this embodiment will be described.

For describing the function, the proportional amplifiers 1a to 1c are connected to the AC output lines U to W at the output side of the transistor inverter as shown in FIG. 2. The inverter uses a DC power source produced by rectifying a commercially available three-phase power source. In general, one of the three-phase lines is grounded. The zero potential of the control circuit sections (one of each input terminals of the proportional amplifiers 1a to 1c is connected to the zero potential terminal) may be in the floating state, but in general, is connected to the ground through the measuring instrument (not shown). Assuming that the first amplifier 1 is in the floating state, the proportional amplifiers 1a to 1c composing the first amplifier 1 receive only the detecting voltages U to W from the inverter output side. In that event, the second amplifier 4 outputs nothing, because the star connection composed of the three-phase inverter output lines leads to the sum of the detecting voltages U to be W to $\hat{U}+\hat{V}+\hat{W}=0$. The third amplifier 6, therefore, outputs only the U to W fundamental waves. After the stages of P-I amplifier 9, the output waves are controlled to have the same waveforms as those of the U to W phase voltage command signals 7a to 7c.

Assuming that the zero potential of the first amplifier 1 is grounded through a measuring instrument and one line of the three-phase power source is grounded, the U to W inputs of the proportional amplifiers 1a to 1c composing the first amplifier 1 are assumed to have complicated waveforms produced by overlapping the AC power component ω on the DC side with the fundamental wave components U to W. If these inputs are joint to the U to W phase commands, the output voltage is distorted as well. The proportional amplifiers 1a to 1c in the first amplifier respectively have the outputs overlapped with the in-phase AC power component. The second amplifier 4 thus outputs $(\hat{U}+\omega)+(\hat{V}+\psi)+(\hat{W}+\omega)=3\omega$. The gain of the second amplifier 4 is set as $\frac{1}{3}$, so that the second amplifier 4 outputs $3\omega/3=\omega$. The amplifiers 6a to 6c composing the third amplifier 6 respectively receive $(U+\omega)-\omega$, $(V+\omega)-\omega$ and $(W+\omega)-\omega$.

Accordingly, the present inverter serves to completely remove all the components except the fundamental waves, compare the fundamental wave components U to W with the U to W phase voltage command signals in the summing section 8 and control the power transistors TU to TZ of the transistor inverter through the PI amplifier 9.

A high-performance inverter requires the frequency to be continuously controlled in the range of zero to a rated frequency Since the disclosed controller directly inputs the voltage detecting value to the first amplifier, it has no frequency limit as would be the case in using an insulating transformer. Thus, the inverter detects the fundamental wave component with high fidelity By providing the second amplifier 4, the inverter controller serves to reliably remove the in-phase AC power component contained in the inverter output. Further, at present in the art in general, the U to W voltage commands controlled by the carrier system are line voltages. On the contrary, as disclosed herein, the first amplifier 1 detects the line voltage wherein the neutral point of the star connection is at the zero potential, and only the in-phase detected values are given to the control target output (P-I amplifier output) and become embodied in a more stable manner in the feedback value of the inverter output voltage, so that the inverter maintains higher control stability. Further, since each in-phase output may be individually adjusted in the case of providing adjusting elements, it is very easy to make the inverter even more perfect. This inverter is controlled by the P-I amplifier following a voltage command signal, so that the power transistor outputs the complete sine voltage waveform. It is, therefore, possible to obtain a precise output voltage without being influenced by a delay or by variations between elements The present inverter therefore, is able to control a motor with quite small torque ripple, provided that an open loop is given in the range of number of revolutions of several hundreds to 1.

Although the invention has been shown and described with respect to a best mode embodiment thereof, it should be understood by those skilled in the art that the foregoing and various other changes, omissions and additions in the form and detail thereof may be made therein without departing from the spirit and scope of this invention.

We claim:

1. An apparatus for controlling an inverter, comprising:
   detection means responsive to inverter output signals, each of said inverter output signals having a fundamental component and harmonic components, for detecting an inverter output fundamental component and providing a fundamental signal, including a summing means, responsive to output signals from the inverter and providing a summed inverter harmonic signal, which signal is the sum of the inverter output signals;
   an amplifier, responsive to said summed inverter harmonic signal having a gain equal to the inverse ratio of the number of inverter output signals, and providing a harmonic signal equal to the harmonic signal of only one of any said inverter output signals;
   a subtracting means, responsive to said harmonic signal and each of the individual inverter output signals, for subtracting and harmonic signal from each of said inverter output signals and providing a fundamental signal of each of said inverter output signals;
   comparing means responsive to said fundamental signal for comparing said fundamental component to an inverter command signal and providing a difference signal having a magnitude indicative of the difference therebetween; and
   means responsive to said difference signal for producing pulse-width-modulated (PWM) signals for controlling said inverter.

2. The apparatus of claim 1, wherein said means responsive to said difference signal comprises a means for comparing said difference signal to a modulating signal and providing PWM signals.

* * * * *